(12) United States Patent
Jahn (10) Patent No.: US 8,998,212 B2
(45) Date of Patent: Apr. 7, 2015

(54) LEAF SEAL

(71) Applicant: ROLLS-ROYCE plc, London (GB)

(72) Inventor: Ingo Henry Johannes Jahn, West End (AU)

(73) Assignee: ROLLS-ROYCE plc, London (GB)

( * ) Notice: Subject to any disclaimer, the term of this patent is extended or adjusted under 35 U.S.C. 154(b) by 233 days.

(21) Appl. No.: 13/673,527

(22) Filed: Nov. 9, 2012

(65) Prior Publication Data

US 2013/0119613 A1 May 16, 2013

(30) Foreign Application Priority Data

Nov. 14, 2011 (GB) .................................. 1119526.0

(51) Int. Cl.
*F16J 15/44* (2006.01)
*F02C 7/28* (2006.01)
*F16J 15/32* (2006.01)

(52) U.S. Cl.
CPC ............... *F02C 7/28* (2013.01); *F16J 15/3292* (2013.01)

(58) Field of Classification Search
CPC ............................ F16J 15/3288; F16J 15/3292
USPC ......................................................... 277/355
See application file for complete search history.

(56) References Cited

U.S. PATENT DOCUMENTS

| 5,135,237 | A | 8/1992 | Flower | |
|---|---|---|---|---|
| 5,324,051 | A | 6/1994 | Schivley, Jr. | |
| 6,267,381 | B1 | 7/2001 | Wright | |
| 6,343,792 | B1 | 2/2002 | Shinohara et al. | |
| 7,703,774 | B2 * | 4/2010 | Awtar et al. | 277/412 |
| 8,272,644 | B1 * | 9/2012 | Aho et al. | 277/355 |
| 8,393,859 | B1 * | 3/2013 | Dillon | 415/173.5 |
| 8,690,158 | B2 * | 4/2014 | Beeck | 277/355 |
| 2008/0169614 | A1 | 7/2008 | Awtar et al. | |
| 2008/0230997 | A1 * | 9/2008 | Boston et al. | 277/355 |
| 2009/0322038 | A1 | 12/2009 | Wright | |

FOREIGN PATENT DOCUMENTS

| EP | 0 933 567 A2 | 8/1999 |
|---|---|---|
| EP | 1 013 975 A1 | 6/2000 |
| EP | 1 900 983 A1 | 3/2008 |

(Continued)

OTHER PUBLICATIONS

Search Report issued in European Patent Application No. EP 12 19 1771 dated Feb. 13, 2013.
Search Report issued in European Patent Application No. EP 12 19 1772 dated Feb. 13, 2013.

(Continued)

*Primary Examiner* — Gilbert Lee
(74) *Attorney, Agent, or Firm* — Oliff PLC (57) ABSTRACT

A leaf seal is provided for effecting a seal between two coaxial, relatively rotating components. The leaf seal has an annular pack of leaves which are stacked face-to-face within the pack, and which are mountable to one of the components at respective root portions of the leaves such that the leaves extend towards the other component and respective edges of the leaves are presented for wiping contact with the other component. The pack includes a plurality of spacers, each spacer separating the root portions of neighboring leaves to form therebetween interleaf gaps which allow an axial leakage flow through the pack. The spacers are distributed around the pack such that the leaves are divided into blocks of two or more leaves sandwiched at their root portions between nearest-neighbor spacers.

10 Claims, 7 Drawing Sheets

(56) References Cited

FOREIGN PATENT DOCUMENTS

| EP | 2 206 938 A2 | 7/2010 |
|---|---|---|
| FR | 2 650 048 A1 | 1/1991 |
| GB | 2 413 602 A | 11/2005 |
| WO | WO 2004/088180 A2 | 10/2004 |

OTHER PUBLICATIONS

Feb. 17, 2012 Search Report issued in British Patent Application No. GB1119526.0.

Feb. 28, 2012 Search Report issued in British Patent Application No. GB1119528.6.

U.S. Appl. No. 13/673,319, filed Nov. 9, 2012; Jahn.

* cited by examiner

Figure 14

LEAF SEAL

FIELD OF THE INVENTION

The present invention relates to a leaf seal for effecting a seal between two coaxial, relatively rotating components.

BACKGROUND OF THE INVENTION

Figure 1:
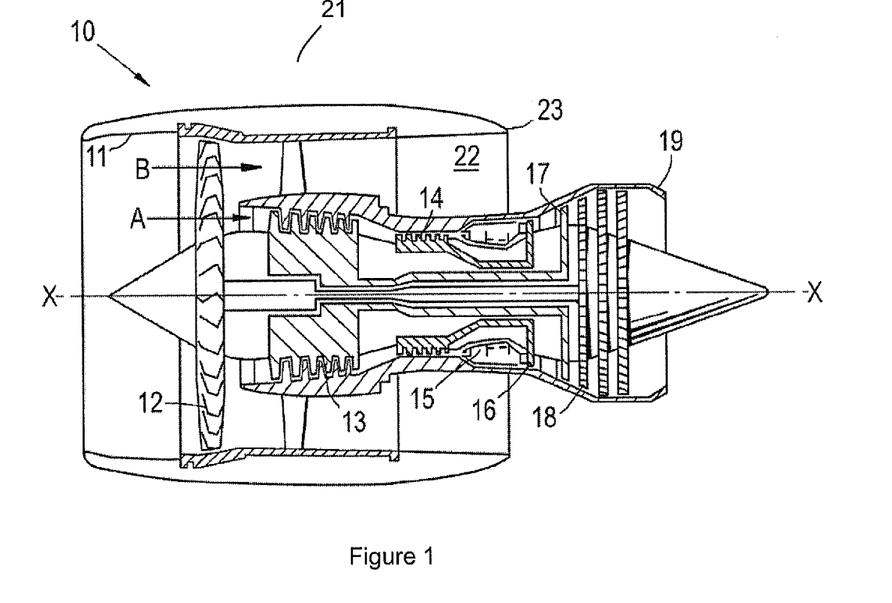
FIG. 1 shows a schematic longitudinal cross-section through a gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Leaf seals are formed from sections of leaf material appropriately presented in order to create a seal surface from juxtaposed leaf edges of respective leaves in an assembly. Typically the leaves are arranged circumferentially about a rotating shaft in order to present the leaf edges and therefore the seal surface towards that shaft in order to provide a seal barrier. Typically, spacer members are provided between each leaf in order to correctly arrange the seal elements for presentation of the leaf edges and therefore the seal surface. These spacers may be independent components or integrally formed with each leaf. The leaf edges and so the seal surface effectively floats upwards and downwards relative to a rotating surface.

Figure 2:
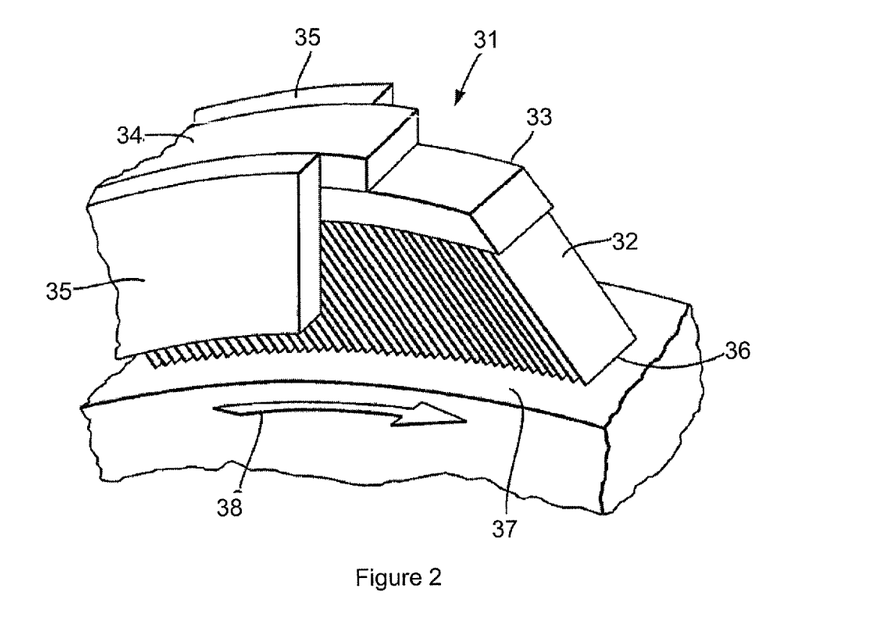
FIG. 2 shows schematically a cut-away perspective view of a portion of a leaf seal assembly.

In a gas turbine engine, leaf seals may be used to form a seal between a static component and a rotating component, between two relatively rotating components, or even between two static components in order to maintain a relatively high pressure on one side of the seal and relatively low pressure on the other. FIG. 2, which shows schematically, for example, a cut-away perspective view of a portion of a leaf seal assembly 31 comprises a pack of leaves 32 extending from spacers 33 secured in a housing comprising a backing ring 34 with coverplates 35. The leaves 32 present leaf edges 36 towards a surface 37 of a rotating component generally rotating in the direction depicted by arrowhead 38. The leaves 32, and in particular the leaf edges 36 of the leaves 32 act against the surface 37 in order to create a seal across the assembly 31.

Each leaf 32 is generally compliant in order to adjust with rotation of the surface 11 to ensure that a good sealing effect is created.

Figure 3:
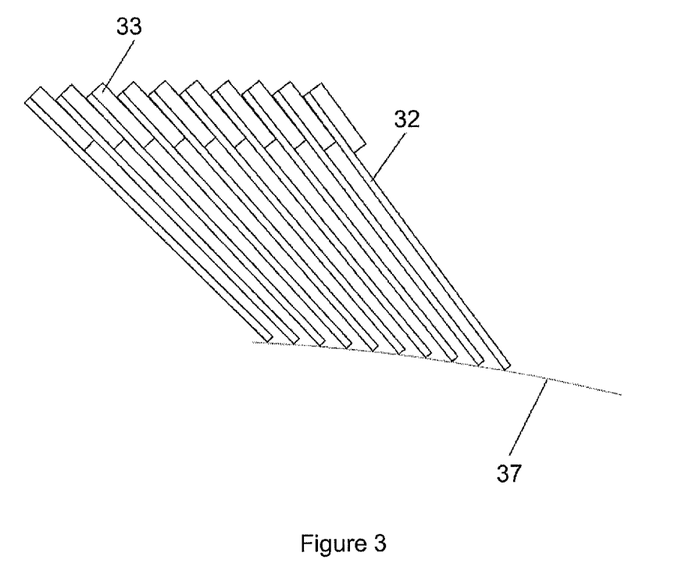
FIG. 3 shows schematically a more detailed view of part of the leaf pack of the assembly of FIG. 2.
Figure 4:
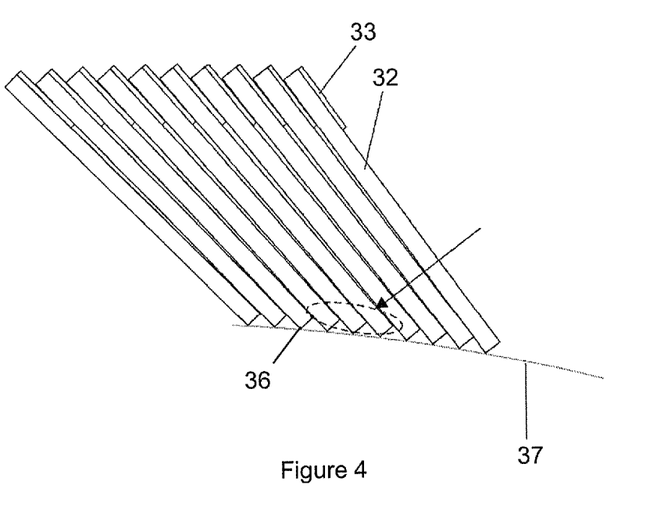
FIG. 4 shows schematically a variant of the leaf pack of FIG. 3.

FIG. 3 shows schematically a more detailed view of part of the leaf pack of the assembly 31. The spacers 33 are present between the root portions of all the leaves 32 and are generally required in order to ensure that flexibility is available to appropriately present the leaves 32 towards the surface 37 which, as illustrated, is generally with an inclined angle between them. By varying the thickness of the spacers 33, the leaf thickness, the leaf length and the angle at which the leaves are positioned, it is possible to change the geometry of the leaf pack. For example, as can be seen in FIG. 4, by changing the relative thicknesses of spacers 33 and the leaves 32, the seal pack can be altered from a non-contact to a contact (arrowed) type pack with contact adjacent to the leaf edges 36. The spacers 33 may be integral with the leaves, or may be separate parts.

Vibration of the leaves, caused by the flow through the seal can be a problem as it may cause fatigue failure in the leaf material. Such cracks tend to grow quickly, leading to loss of leaf material.

The above problem occurs both in leaf packs with straight leaves and in leaf packs within which inter-leaf contact exists at the leaf tips. Large leaf-to leaf interference at the tips has been seen to alleviate this problem. A similar effect has also been seen with very thick leaves.

In large diameter seals, it is not possible to create significant amount of leaf-to-leaf interference at the leaf tips. This may lead to a limitation of the leaf seal to smaller diameter applications

SUMMARY OF THE INVENTION

An aim of the present invention is to provide performance improvements in leaf seals.

The present invention provides in a first aspect a leaf seal for effecting a seal between two coaxial, relatively rotating components, the leaf seal having an annular pack of leaves which are stacked face-to-face within the pack, and which are mountable to one of the components at respective root portions of the leaves such that the leaves extend towards the other component and respective edges of the leaves are presented for wiping contact with the other component;
  wherein the pack includes a plurality of spacers, each spacer separating the root portions of neighbouring leaves to form therebetween interleaf gaps which allow an axial leakage flow through the pack; and
  wherein the spacers are distributed around the pack such that the leaves are divided into blocks of two or more leaves sandwiched at their root portions between nearest-neighbour spacers.

The present invention provides in a second aspect a pack of leaves for the leaf seal of the first aspect.

By forming the leaves into blocks between the spacers, the leaves within each block can interfere with each other, for example over substantially greater contact areas than is possible in conventional seals of the type shown in FIG. 4. This interference has been found to alleviate the problem of fatigue cracking within the leaves. In particular, frictional contact between the leaves can be created. This friction, and associated energy loss, can cause energy to be dissipated and thereby dampen leaf vibrations.

Optional features of the invention will now be set out. These are applicable singly or in any combination with any aspect of the invention.

The leaves may be divided into blocks of three, four, eight or more leaves. Increasing the number of leaves in the blocks can increase the overall amount of leaf-to-leaf interference (i.e. there are fewer "end" leaves), and can also reduce the leakage flow through the seal. Preferably, within each block, the leaves make face-to-face contact with their nearest-neighbour leaves in the block over substantially their entire lengths from their respective root portions to their respective wiping contact edges. Frictional contact between the leaves over such a large area can improve the dampening of leaf vibrations.

The spacers may be distributed such that the number of leaves in each block varies around the pack. For example, the number of leaves in each block may vary irregularly or randomly. Such variation can help to reduce any tendency for the pack to resonate.

Surfaces of the leaves in the blocks may be treated to adjust the amount of frictional damping between the leaves. For example, the surfaces may be coated (e.g. with PTFE), polished and/or linished to increase or decrease the amount of frictional damping.

Within each block the root portions may be stacked along a straight line, the circumferential curvature of the annular pack being generated by angularly offsetting adjacent blocks from each other. Such an approach to pack assembly is most relevant in relation to large diameter seals, where a given length of straight section of pack will be accommodated in fewer degrees of arc. The wiping contact edges of the leaves can be created by profiling the respective side of the block to match the radius of the other component. Alternatively, the wiping contact edges can be formed by allowing the leaves to wear in use by contact with the other component.

The leaf seal can be used, for example, in gas and steam turbines, and jet engines. However, it may also be used in other applications where sealing between a high and low pressure region is required along a shaft.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 5:
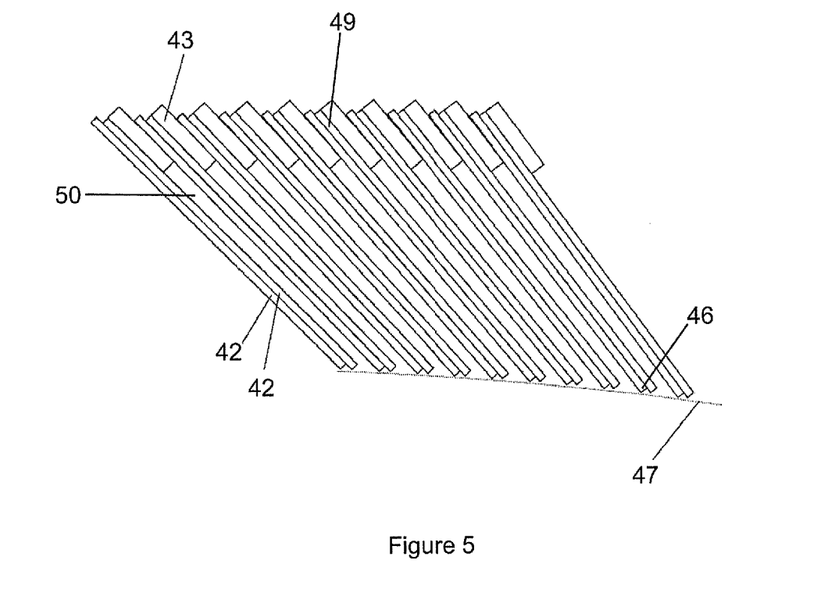
FIG. 5 shows schematically a view of part of an annular leaf pack for a seal according to a first embodiment of the present invention.

FIG. 5 shows schematically a view of part of an annular leaf pack for a seal according to a first embodiment of the present invention. The leaves 42 of the pack are mounted at respective root portions 49 to a radially outer stationary housing (not shown) and extend towards leaf edges 46 that make wiping contact with the surface 47 of a radially inner rotor.

Spacers 43 are positioned around the pack after every second root portion. The spacers thus divide the pack into a plurality of leaf blocks, each containing two leaves 42 making face-to-face contact with each other over their entire length from their root portions 49 to their edges 46. The spacers also form interleaf gaps 50 between the end leaves of adjacent blocks, the gaps allowing an axial leakage flow through the pack.

Figure 6:
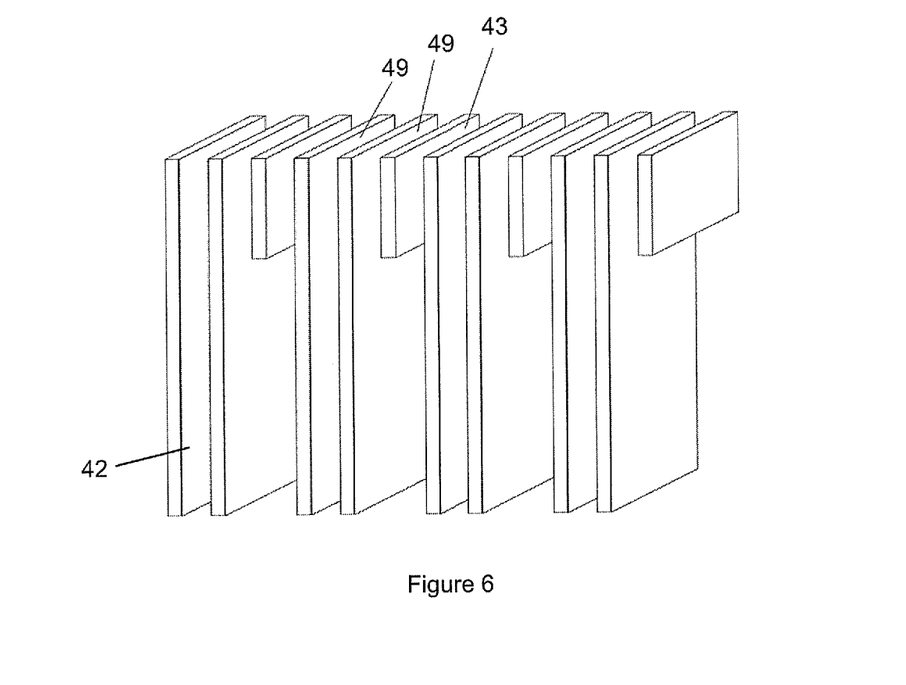
FIG. 6 shows schematically the leaf pack of FIG. 5 before final assembly.
Figure 7:
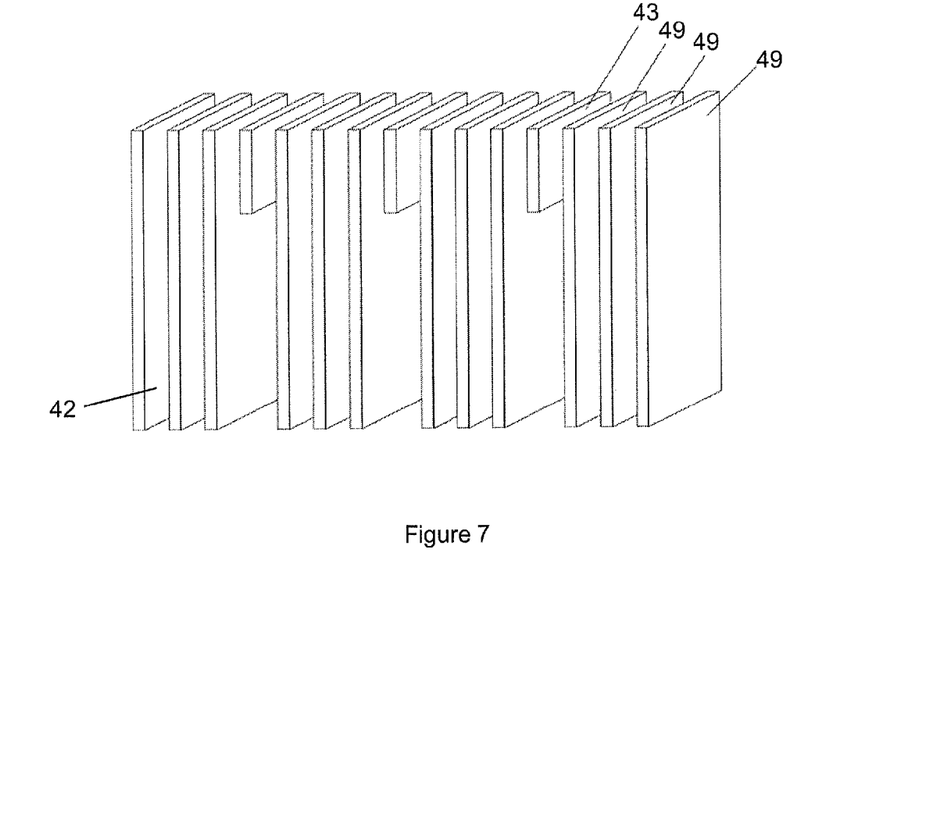
FIG. 7 shows schematically a variant of the leaf pack of FIG. 5 before final assembly.

FIG. 6 shows schematically the leaf pack of FIG. 5 before final assembly into a housing (not shown) comprising typically a backing ring and coverplates. In variants of the leaf pack, the spacers 43 can be positioned around the pack after more than two root portions. For example, FIG. 7 shows schematically a leaf pack before final assembly in which the spacers divide the leaves into blocks of three leaves 42 each. Indeed, a more irregular or random distribution of the spacers around the pack can be adopted so that the number of leaves in each block correspondingly varies. Such irregular or random distributions can reduce any tendency for the leaf pack to resonate with coupled vibrations.

Advantageously, by placing the leaves 42 in direct contact within each block, frictional contact between the leaves is created. This friction and associated energy loss can cause energy to be dissipated and thereby can dampen vibrations in the leaves that might otherwise lead to fatigue failure. Furthermore, if the leaves are surface treated, such as by coatings (e.g. PTFE), polishing or linishing, then the amount of frictional damping may be controllably increased or decreased. The leaves can be formed by stamping out from sheet material, and treatments of this type can be applied to the sheet before the stamping procedure.

Relatively thick leaves can also have a reduced susceptibility to fatigue cracking. However, a disadvantage of using thick leaves is that the mechanical stiffness of the leaf increases in proportion to its thickness cubed. By using blocks of thinner leaves the same reduced susceptibility to fatigue cracking can be achieved but the mechanical stiffness increases only linearly (plus a small amount due to friction).

Figure 8:
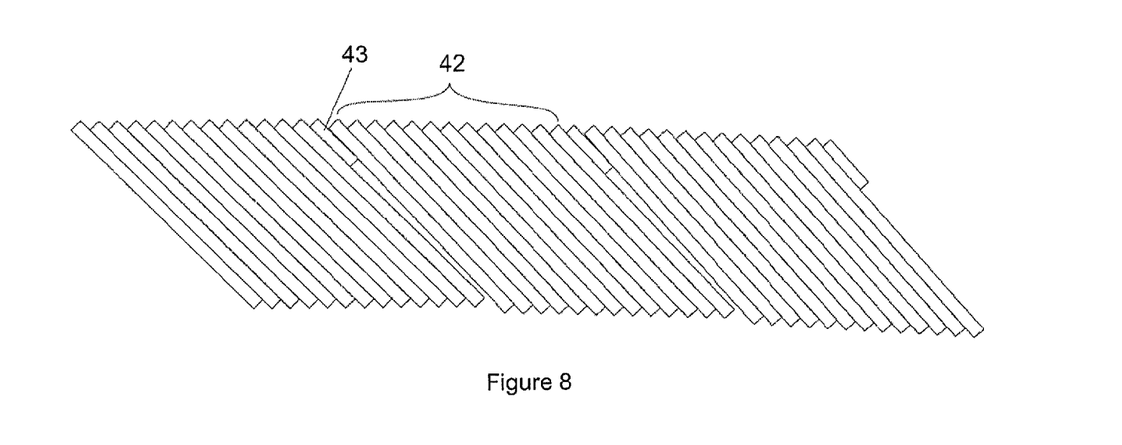
FIG. 8 shows schematically a view of part of an annular leaf pack for a large diameter seal according to a second embodiment of the present invention.
Figure 9:
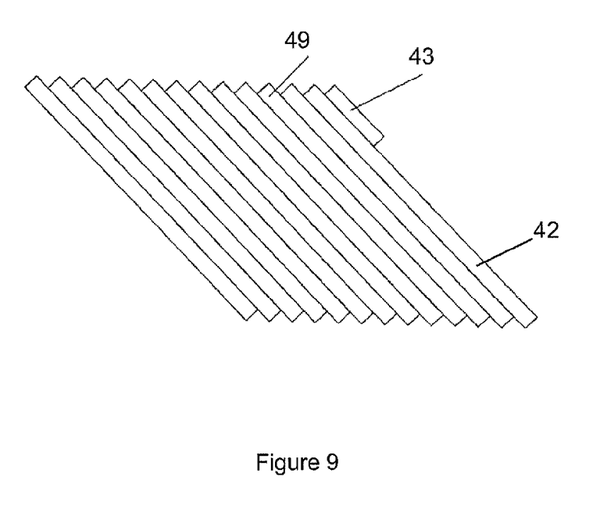
FIG. 9 shows schematically a straight leaf seal section corresponding to a block of leaves of the leaf pack of FIG. 8.

In large diameter seals with low curvature, the leaf pack can be divided into blocks by the spacers such that the blocks contain large numbers of leaves 42 (e.g. 50 leaves per block). Such an arrangement, as shown schematically in FIG. 8, can impart improved sealing performance due to the possibility to have increased contact between most leaves and only relatively few interleaf gaps 50. That is, the total packing ratio (defined as the area occupied by leaves versus the total area of leaves and interleaf gaps, when the seal is viewed axially) of the seal can be increased significantly, while still maintaining a compliant seal. To make such a seal, one option is to assemble the seal from a number of straight leaf seal sections each corresponding to a block of leaves in which the root portions of the leaves are stacked along a straight line, as shown schematically in FIG. 9. The side of each of the sections facing the rotor can be profiled to match the rotor radius or can be allowed to wear to fit. In the final pack assembly, the sections are angularly offset from each other to form the complete seal annulus. Typically each section contains one block of leaves, but it is also possible for each section to contain more than one block of leaves, with spacers dividing the blocks within each section.

Figure 10:
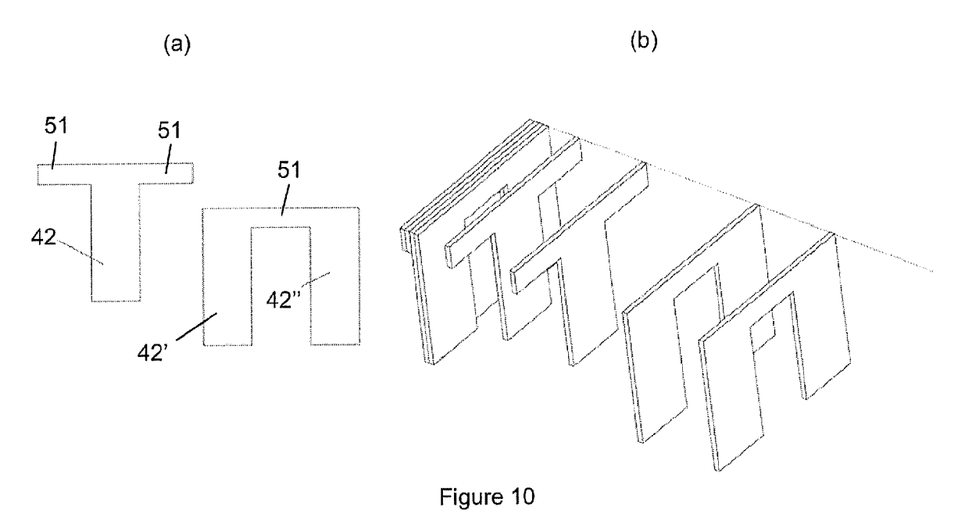
FIG. 10 shows schematically (a) a T-shaped lamellae and an inverted-U-shaped lamella, and (b) the assembly of the T-shaped lamellae and inverted-U-shaped lamellae into three leaf packs of a third embodiment of the present invention.
Figure 11:
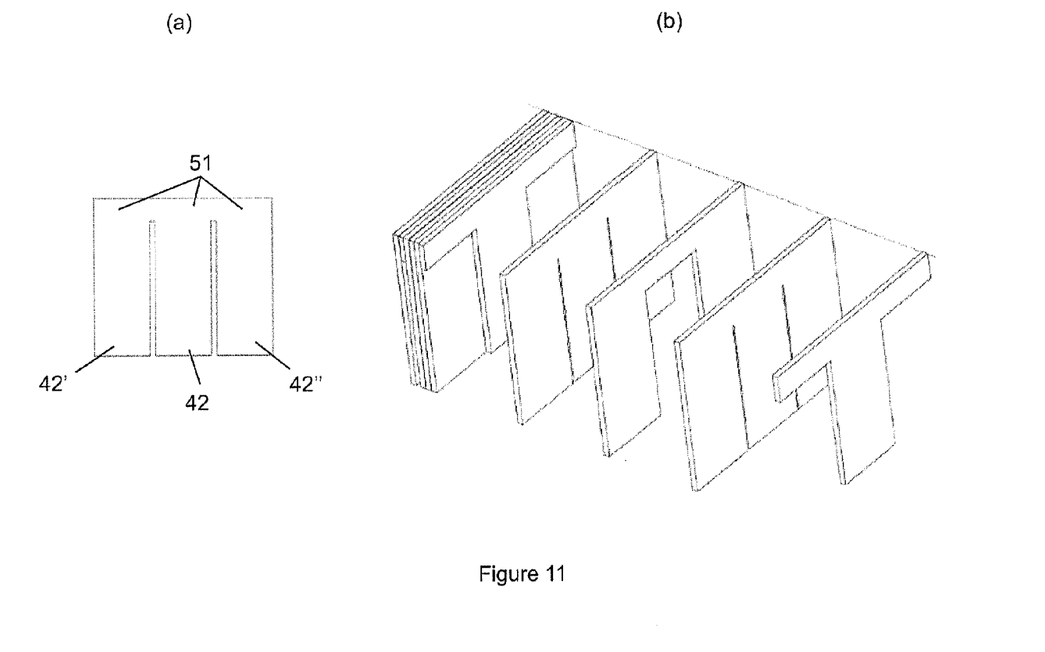
FIG. 11 shows schematically (a) an M-shaped lamella, and (b) the assembly of M-shaped lamellae, T-shaped lamellae and inverted-U-shaped lamellae into three leaf packs of a fourth embodiment of the present invention.

The concept of distributing the spacers around a leaf pack so that the leaves are divided into blocks of two or more leaves sandwiched at their root portions between nearest-neighbour spacers can be extended to seals having a plurality of leaf packs. For example, in relation to a seal according to a third embodiment of the present invention and having three axially spaced annular packs, FIG. 10 shows schematically (a) a T-shaped lamella and an inverted-U-shaped lamella for forming the leaves of the packs, and (b) the lamellae in readiness for assembly. Each T-shaped lamella provides a leaf 42 and two spacer portions 51 which extending laterally from either side of the root portion of the leaf. Each inverted-U-shaped lamella provides two leaves 42', 42" and a spacer portion 51 which bridges the root portions of the leaves. The lamellae are assembled such that the leaves of the T-shaped lamellae form a central leaf pack and the spacer portions of the T-shaped lamellae form spacers between leaves of outer leaf packs, while the leaves of the inverted-U-shaped lamellae form the outer leaf packs and the spacer portions of the inverted-U-shaped lamellae form spacers between leaves of the central leaf pack. The lamellae are assembled in blocks of alternating T-shaped and inverted-U-shaped lamellae (as shown in FIG. 10(b) there are two lamellae of a given type per block), such that, within each pack, adjacent spacer elements combine to form spacers, with the leaves being divided by the spacers into blocks of leaves sandwiched at their root portions between nearest-neighbour spacers. In addition to the inverted-U-shaped and T-shaped lamellae, it may also be beneficial to use a 3-pronged, M-shaped lamella (as shown in FIG. 11(a)) in the pack assembly, each M-shaped lamella providing three leaves 42, 42', 42" and three spacer portions 51. By interspersing inverted-U-shaped, T-shaped and M-shaped lamellae as shown in FIG. 11(b), improved leakage characteristics and vibration resistance compared to the embodiment from FIG. 10 may be achieved.

Figure 12:
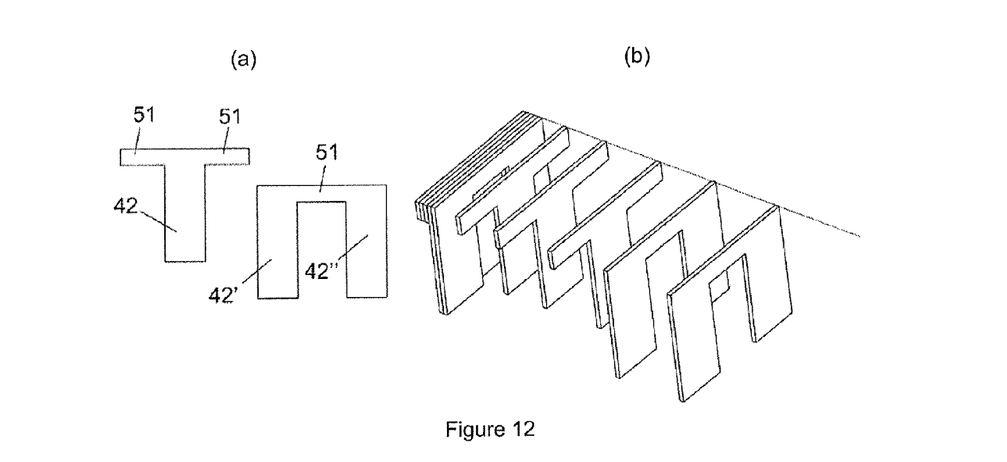
FIG. 12 shows schematically (a) a T-shaped lamellae and an inverted-U-shaped lamella, and (b) the assembly of the T-shaped lamellae and inverted-U-shaped lamellae into three leaf packs of a variant of the third embodiment of the present invention.
Figure 13:
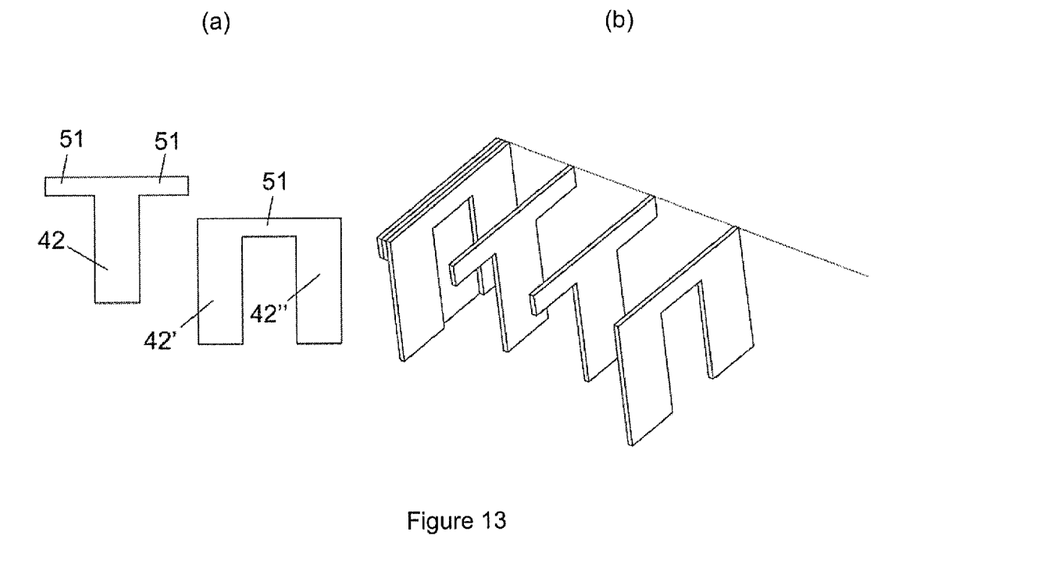
FIG. 13 shows schematically (a) a T-shaped lamellae and an inverted-U-shaped lamella, and (b) the assembly of the T-shaped lamellae and inverted-U-shaped lamellae into three leaf packs of a further variant of the third embodiment of the present invention.

In a seal with plural packs, the possibility exists to increase the stiffness of one or more of the packs by increasing the packing density of those packs relative to the rest. For example, in relation to a seal according to a variant of the third embodiment of FIG. 10 and having three axially spaced annular packs, FIG. 12 shows schematically (a) a T-shaped lamella and an inverted-U-shaped lamella for forming the leaves of the pack, and (b) the lamellae in readiness for assembly. In the variant, there are more T-shaped lamellae than inverted-U-shaped lamellae so that the effective stiffness of the central leaf pack is higher than the stiffness of the outer leaf packs. In relation to a seal according to a further variant of the third embodiment of FIG. 10 and having three axially spaced annular packs, FIG. 13 shows schematically (a) a T-shaped lamella and an inverted-U-shaped lamella for forming the leaves of the pack, and (b) the lamellae in readiness for assembly. In the further variant, there are more T-shaped lamellae than inverted-U-shaped lamellae such that only the central leaf pack contains leaves 42 making face-to-face contact with each other.

Figure 14:
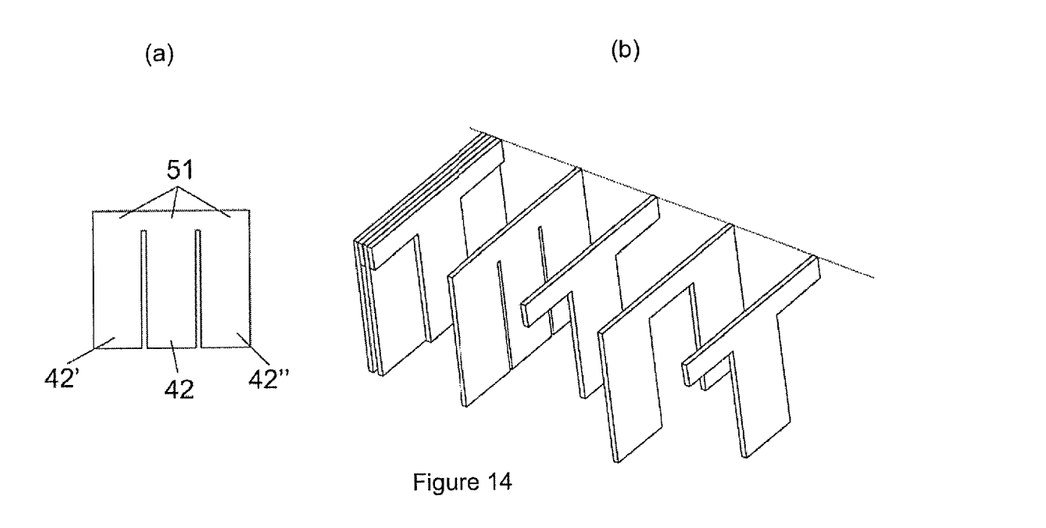
FIG. 14 shows schematically (a) an M-shaped lamella, and (b) the assembly of M-shaped lamellae, T-shaped lamellae and inverted-U-shaped lamellae into three leaf packs of a variant of the fourth embodiment of the present invention.

In a similar fashion, FIG. 14 shows schematically (a) an M-shaped lamella, and (b) inverted-U-shaped, T-shaped and M-shaped lamellae in readiness for assembly according to a variant of the fourth embodiment of FIG. 11. By increasing the number of T-shaped lamellae compared to inverted-U-shaped lamellae, as shown in FIG. 14, improved leakage characteristics and vibration resistance compared to the seal of FIG. 12 may be achieved while still maintaining a stiffer central leaf pack.

In relation to both the third and fourth embodiments, rather than increasing the number of T-shaped lamellae relative to the number of inverted-U-shaped lamellae, it is possible to increase the number of inverted-U-shaped lamellae relative to the number of T-shaped lamellae in order to stiffen the outer packs relative to the central pack.

While the invention has been described in conjunction with the exemplary embodiments described above, many equivalent modifications and variations will be apparent to those skilled in the art when given this disclosure. For example, in the above embodiments, the leaf packs are mounted to a radially outer housing and their leaves extend towards an inner rotor. However, in other embodiments, the packs could be mounted to a radially inner component and their leaves extend towards an outer component. In another example, the leaf packs of the above embodiments contain straight leaves. However, in other embodiments, the packs could contain leaves that are deformed (e.g. bent towards the shaft or bent away from the shaft). The leaves can be manufactured with such a deformation, or can attain the deformation by a heat treating process, inter-leaf restraints or leaf-rotor restraints after seal assembly. Accordingly, the exemplary embodiments of the invention set forth above are considered to be illustrative and not limiting. Various changes to the described embodiments may be made without departing from the spirit and scope of the invention.

The invention claimed is:

1. A leaf seal for effecting a seal between two coaxial, relatively rotating components, the leaf seal having an annular pack of leaves which are stacked face-to-face within the pack, and which are mountable to one of the components at respective root portions of the leaves such that the leaves extend towards the other component and respective edges of the leaves are presented for wiping contact with the other component;

wherein the pack includes a plurality of spacers that are circumferentially distributed and extending axially in an axial direction of the components, each spacer separating the root portions of neighbouring leaves to form therebetween interleaf gaps which allow an axial leakage flow through the pack; and wherein the spacers are distributed around the pack such that the leaves are divided into blocks of two or more leaves sandwiched at their root portions between nearest-neighbour spacers.

2. A leaf seal according to claim 1, wherein within each block the leaves make face-to-face contact with their nearest-neighbour leaves in the block over substantially their entire lengths from their respective root portions to their respective wiping contact edges.

3. A leaf seal according to claim 2, wherein the spacers are distributed such that the number of leaves in each block varies around the pack.

4. A leaf seal according to claim 2, wherein surfaces of the leaves in the blocks are treated to adjust the amount of frictional damping between the leaves.

5. A leaf seal according to claim 2, wherein within each block the root portions are stacked along a straight line, the circumferential curvature of the annular pack being generated by angularly offsetting adjacent blocks from each other.

6. A leaf seal according to claim 1, wherein the spacers are distributed such that the number of leaves in each block varies around the pack.

7. A leaf seal according to claim 1, wherein surfaces of the leaves in the blocks are treated to adjust the amount of frictional damping between the leaves.

8. A leaf seal according to claim 1, wherein within each block the root portions are stacked along a straight line, the circumferential curvature of the annular pack being generated by angularly offsetting adjacent blocks from each other.

9. A pack of leaves for the leaf seal of claim 1.

10. A pack of leaves for the leaf seal of claim 2.

* * * * *